L. LORENTOWICZ.
METHOD FOR REPAIRING SCORED CYLINDERS.
APPLICATION FILED JULY 9, 1914.
1,169,658.
Patented Jan. 25, 1916.
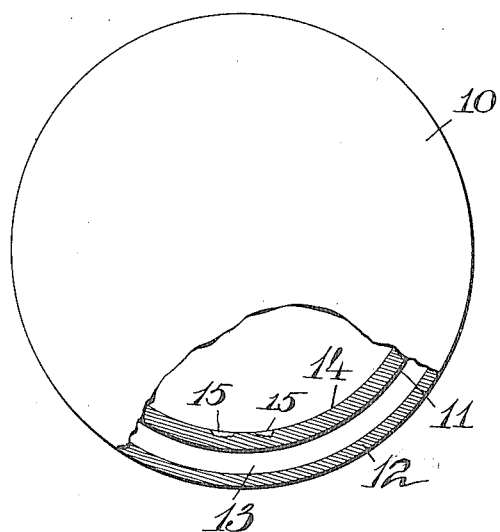
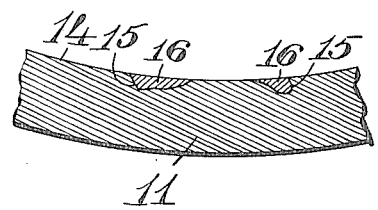
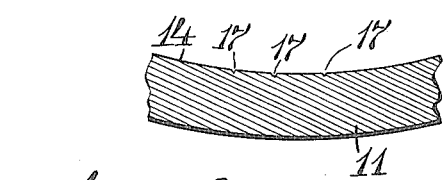
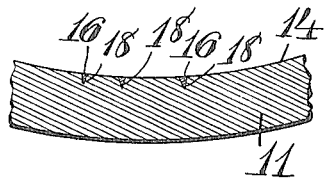
WITNESSES:
INVENTOR:
Leonard Lorentowicz,
BY
Dyke & Canfield.
ATTORNEYS.

UNITED STATES PATENT OFFICE.

LEONARD LORENTOWICZ, OF IRVINGTON, NEW JERSEY.

METHOD FOR REPAIRING SCORED CYLINDERS.

1,169,658.  Specification of Letters Patent.  Patented Jan. 25, 1916.

Application filed July 9, 1914. Serial No. 849,972.

*To all whom it may concern:*

Be it known that I, LEONARD LORENTOWICZ, a citizen of the United States, and a resident of Irvington, county of Essex, and State of New Jersey, have invented certain new and useful Improvements in Methods for Repairing Scored Cylinders, of which the following is a specification.

This invention relates to an improved method for filling the scores in cylinders, and is particularly adapted for repairing cylinders of internal combustion engines.

It is well known that a great many cylinders of internal combustion engines are damaged by wear and very often they are scored to a considerable extent by foreign matter getting into the cylinder or by parts of the apparatus becoming disarranged and scratching or gouging the interior of the cylinder so that there is no tight fit between the piston and the cylinder, and this of course prevents compression and the engine soon becomes useless. This scoring is very often done by reason of a wrist pin coming loose and being carried along by the piston and it scrapes the interior wall of the cylinder so that it becomes channeled or scored.

It has been the practice to repair scored cylinders by reboring them, and this is a slow method and is expensive because it takes time; it also necessitates the use of a new size piston ring. Another method has been to weld the scored parts of the cylinder, but in subjecting the cylinder to a welding heat the cylinder becomes warped and needs reboring on account of this warping and consequent disturbing of the contour of the inside of the cylinder.

My invention relates to an improvement in the repairing of scored cylinders, and such improvement is fully described and set forth in the accompanying specification and is finally embodied in the clauses of the claim.

The method of applying my invention to the repairing of cylinders is illustrated in the accompanying drawing, in which—

Figure 1 is a top view of a cylinder of an internal combustion engine such as an automobile engine, the cylinder being shown scored at the place where it is broken away. Fig. 2 is an enlarged section of the scored part of the cylinder, but showing the scored or channeled wall filled and flush with the wall of the cylinder. Figs. 3 and 4 are sections similar to Fig. 2, Fig. 3 showing the cylinder wall with slight or small scratches or scores, and Fig. 4 showing said scored parts after they have been filled.

Of course it will be understood that the particular type of engine need not be shown, and I have shown in this drawing only a conventional form of cylinder 10 with an inner wall 11 and an outer wall 12 forming, between them, a water space 13 through which water is circulated to keep the cylinder cool when it is being run, this water being supplied by the usual water circulating system with which all water cooled engines are equipped and which is understood by those skilled in the art, and for that reason it is not explained in detail here. The face 14 of the inner wall 11 is in contact with the piston and the packing rings of the piston which operate within the cylinder, and it frequently happens that this wall 14 becomes scored in different ways and very often by the ends of a wrist pin which comes loose, and such scoring is shown at 15 in Fig. 1. This scoring is sometimes quite extensive, and such extensive scoring is shown in Figs. 1 and 2. If the old method of welding is resorted to the cylinder is subjected to a high heat which very often warps it and the cylinder then requires reboring, and I have devised a means and method for filling the scored parts without the application of a heat such as is necessary in the welding process. I fill the scores and scratches with a molten metal by means of a soldering iron, this molten metal being one that has a high melting point so that it is not affected, after it is placed in the cylinder, by the degree of heat generated by the combustion of the fuel in the engine cylinder. I have found that a very good metal for this purpose is block tin, and this can be further hardened, if necessary, by the addition of from one to two per cent. of silver, although this addition of silver is not absolutely essential.

The drawing in Fig. 2 shows the scored parts 15 filled with the metal 16. The metal is put into the grooves and it is then scraped, either with an arc-shaped scraper or with any other suitable scraper, not shown, so that it is substantially concentric and flush with the surface 14 of the cylinder. It is usual to first apply to the scored part a suitable flux so that the metal attaches itself well to the metal of the cylinder, such flux consisting of acid and sal ammoniac or any of the usual fluxes that are used in soldering operations.

In Fig. 3 I show the cylinder wall 11 provided, on its face 14, with grooves 17 which are shown small in proportion to the thickness of the wall of the cylinder, being virtually small scratches. When these scratches occur and it is desired to fill them with metal, I deepen the scratches, that is, I score them to a greater extent so that a bigger area is presented for the fastening of the metal 16, which metal is shown in Fig. 4 after it is applied to the scratches 17 which have been deepened as shown at 18 in said Fig. 4. I have found that this metal, when applied and reduced to the contour of the wall of the cylinder, forms a smooth surface, and cylinders so treated have given long service without any leaking between the piston and the cylinder. The metal is of a high melting point so that the running of the engine does not furnish enough heat to cause the filling to melt. This is particularly true in the case of a water cooled engine.

Having thus described my invention, I claim:

1. The method described, which consists in subjecting scores in a cylinder to a suitable flux, filling the scores with block tin, and then reducing the filling to the contour of the wall of the cylinder.

2. The method described, which consists in subjecting scores in a cylinder to a suitable flux, filling the scores with block tin and silver, and then reducing the filling to the contour of the wall of the cylinder.

In testimony that I claim the foregoing, I have hereunto set my hand, this 8th day of July, 1914.

LEONARD LORENTOWICZ.

Witnesses:
M. A. JOHNSON,
H. TRAUTVETTER.